United States Patent
Koshida

(10) Patent No.: US 9,521,283 B2
(45) Date of Patent: Dec. 13, 2016

(54) IMAGE FORMING APPARATUS

(71) Applicant: CANON KABUSHIKI KAISHA, Tokyo (JP)

(72) Inventor: Kohei Koshida, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/669,344

(22) Filed: Mar. 26, 2015

(65) Prior Publication Data

US 2015/0288850 A1 Oct. 8, 2015

(30) Foreign Application Priority Data

Apr. 4, 2014 (JP) ................. 2014-077455

(51) Int. Cl.
*G06K 15/00* (2006.01)
*H04N 1/00* (2006.01)

(52) U.S. Cl.
CPC ........ *H04N 1/00718* (2013.01); *H04N 1/0079* (2013.01); *H04N 1/00734* (2013.01); *H04N 1/00779* (2013.01)

(58) Field of Classification Search
None
See application file for complete search history.

(56) References Cited

U.S. PATENT DOCUMENTS

| | | | |
|---|---|---|---|
| 8,014,700 B2 | 9/2011 | Takei | |
| 8,315,538 B2 | 11/2012 | Takei | |
| 8,774,664 B2 | 7/2014 | Koshida | |
| 8,864,123 B2 | 10/2014 | Kamiya et al. | |
| 2003/0161012 A1* | 8/2003 | Kusunose | H04N 1/0057 358/498 |
| 2008/0237979 A1* | 10/2008 | Tamura | B65H 9/002 271/270 |
| 2009/0080948 A1* | 3/2009 | Takei | G03G 21/1647 399/308 |
| 2011/0110685 A1* | 5/2011 | Sato | G03G 15/1605 399/121 |
| 2011/0280624 A1 | 11/2011 | Takei | |
| 2012/0093554 A1* | 4/2012 | Suzuki | B65H 7/02 399/381 |
| 2012/0133093 A1* | 5/2012 | Saito | B65H 7/08 271/227 |
| 2014/0211274 A1* | 7/2014 | Ohta | H04N 1/00519 358/482 |

FOREIGN PATENT DOCUMENTS

| | | | |
|---|---|---|---|
| JP | 2009-075479 A | 4/2009 | |
| JP | 5078522 B2 | 11/2012 | |

* cited by examiner

*Primary Examiner* — Marivelisse Santiago Cordero
*Assistant Examiner* — Neil R McLean
(74) *Attorney, Agent, or Firm* — Fitzpatrick, Cella, Harper & Scinto

(57) ABSTRACT

An image forming apparatus of the present invention includes: a skew correction unit configured to correct skew feeding of a recording material and convey the recording material; a transfer unit configured to include an image bearing member which carries a toner image to be transferred onto the recording material corrected in the skew feeding by the skew correction unit; an opening/closing door configured to be provided in an apparatus body of the image forming apparatus to be opened; and a positioning member configured to include a first positioning portion to position the skew correction unit and a second positioning portion to position the transfer unit.

28 Claims, 15 Drawing Sheets

IMAGE FORMING APPARATUS

BACKGROUND OF THE INVENTION

Field of the Invention

The present invention relates to an image forming apparatus which forms an image in a recording material.

Description of the Related Art

Conventionally, there is known an image forming apparatus of an electrophotographic system in which toner images of colors are is transferred in a sequentially superimposed manner onto an intermediate transfer belt in a transfer unit and the toner images carried in the intermediate transfer belt are collectively transferred by a transfer roller onto a recording material conveyed from a registration roller.

Accuracy of a relative geometric characteristic between the recording material and the image depends on a registration unit which performs skew correction of the recording material in order not to obliquely convey the recording material with respect to the image, and a transfer unit which transfers an unfixed image onto the recording material.

In an image forming apparatus disclosed in U.S. Patent Application Publication No. 2011/280624 A1, the transfer unit is configured to be capable of being pulled out of the image forming apparatus.

The image is obliquely printed with respect to the recording material due to a deviation of an apparatus position of the transfer unit, so that an adverse effect rises in the accuracy of the geometric characteristic.

SUMMARY OF THE INVENTION

It is desirable to avoid a problem in that an image is obliquely printed in a recording material.

In order to achieve the above object, an image forming apparatus of the invention includes: a skew correction unit configured to correct skew feeding of a recording material and convey the recording material; a transfer unit configured to include an image bearing member which carries a toner image to be transferred onto the recording material corrected in the skew feeding by the registration unit; an opening/closing door configured to be provided in an apparatus body of the image forming apparatus to be opened; and a positioning member configured to include a first positioning portion to position the skew correction unit and a second positioning portion to position the transfer unit, wherein the positioning member includes a guide portion which guides skew correction unit and the transfer unit which is inserted or removed with respect to the opening/closing door when the opening/closing door is opened.

Further features of the present invention will become apparent from the following description of exemplary embodiments with reference to the attached drawings.

DESCRIPTION OF THE EMBODIMENTS

Hereinafter, exemplary embodiments of the invention will be described in detail with reference to the drawings. However, dimensions, materials, shapes, relative arrangement of components described in the following embodiments may be suitably changed depending on a configuration or various conditions of the apparatus of the invention. Therefore, if not otherwise specified, there is no purpose of limiting the scope of the invention only to these embodiments.

First Embodiment (Image Forming Apparatus)

Figure 1:
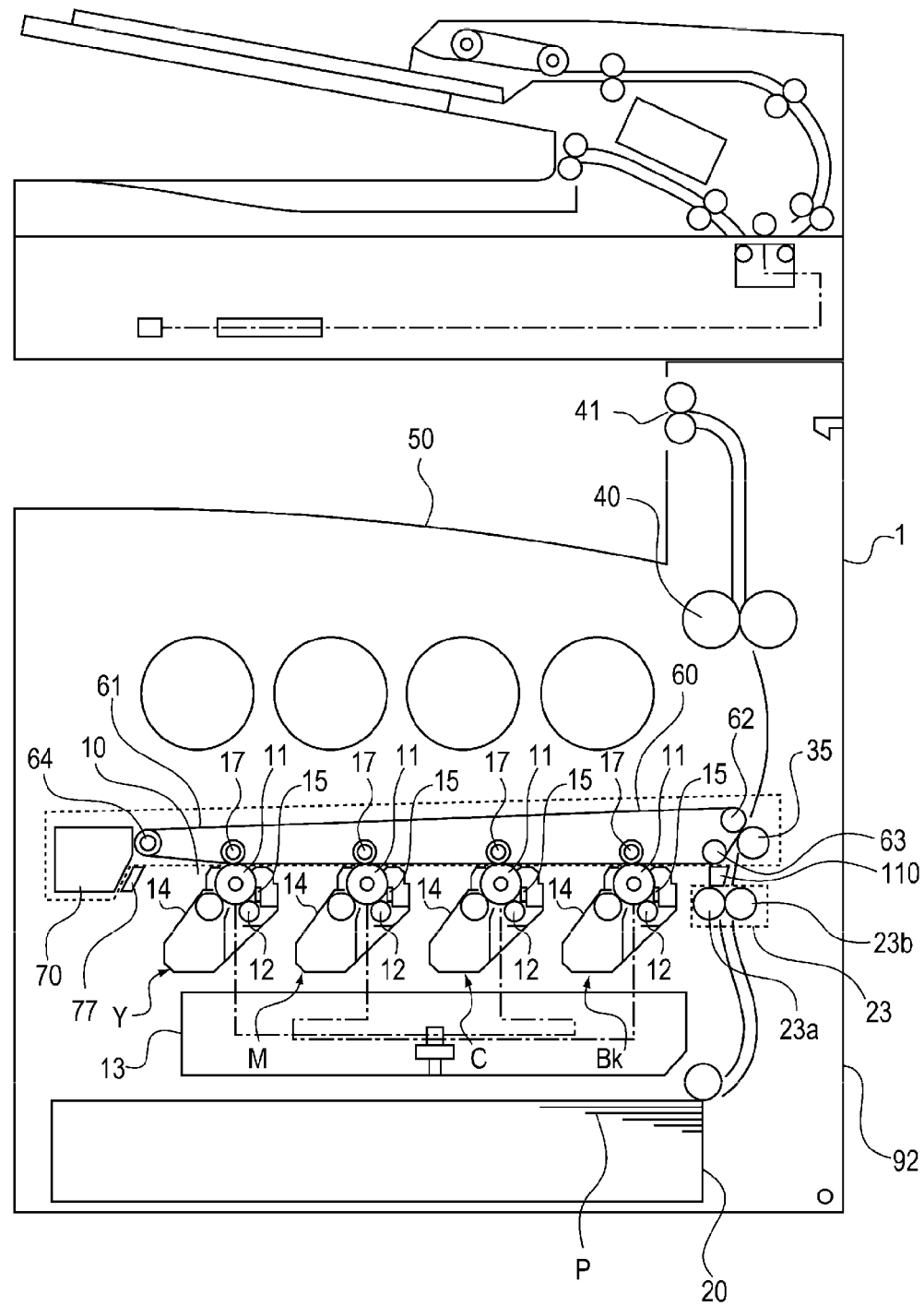
FIG. 1 is a cross-sectional view of an image forming apparatus of a first embodiment.

An image forming apparatus according to a first embodiment of the invention will be described. FIG. 1 is a cross-sectional view schematically illustrating the image forming apparatus of the embodiment.

The image forming apparatus includes image forming portions of the respective colors of Y (yellow), M (magenta), C (cyan), and Bk (black). In the respective image forming portions, after the surface of a photosensitive drum 11 is uniformly charged by a charging roller 12, a latent image is formed by a laser scanner 13 which is driven based on a signal of image information thus transferred. The latent image formed in the photosensitive drum 11 is actualized as a toner image by a development device 14. The toner image on the photosensitive drum 11 is applied with a predetermine pressure and an electrostatic load bias by a primary transfer roller 17 serving as a part of a transfer unit 60, and thus sequentially transferred onto an intermediate transfer belt 61. After the transfer, the toner left on the photosensitive drum 11 is removed and collected by a photosensitive drum cleaner 15, and prepared for the next image forming again.

On the other hand, recording materials P are fed one by one from a sheet cassette 20, and conveyed to a registration unit 23 serving as a skew correction unit. The leading end of the recording material P forms a loop along a nip portion which is configured by a registration inner-roller 23a and a registration outer-roller 23b of the registration unit 23, so that the skew feeding is corrected. Thereafter, the registration unit 23 conveys the recording material P, in synchronization with the toner image on the intermediate transfer belt 61, to a portion between a transfer driving roller 62 which drives the intermediate transfer belt 61 of the transfer unit 60 and a secondary transfer outer-roller 35 which is a transfer member. A color toner image on the intermediate transfer belt 61 is applied with the predetermined pressure and the electrostatic load bias in the nip portion (a transfer portion) between the transfer driving roller 62 and the secondary transfer outer-roller 35 which are disposed to face each other, and thus transferred onto the recording material P.

In addition, an image pattern detection unit (hereinafter, referred to as a detection unit) 110 serving as a registration detection unit is disposed between the registration unit 23 and the transfer unit 60. The detection unit 110 reads an image pattern of the toner image on the intermediate transfer belt 61. Based on a signal from the detection unit 110 when the detection unit 110 detects the image pattern, a controller of the image forming apparatus makes control such that the image is correctly formed through writing correction of the laser scanner 13 in proportion to an inclined amount of the image.

Through a series of these operations, a relative inclination between the recording material P and the image is corrected, and the quality of a geometric characteristic of the resultant image is stabilized.

After the transfer, the toner left on the intermediate transfer belt 61 is removed and collected by a cleaning unit 70, and prepared for the next image forming again. The toner image transferred onto the recording material P is fixed by being heated and pressured by a fixing device 40 serving as a fixing portion, and then discharged onto a discharge tray 50 by a pair of discharge rollers 41.

(Configuration of Registration Unit)

Figure 2A:
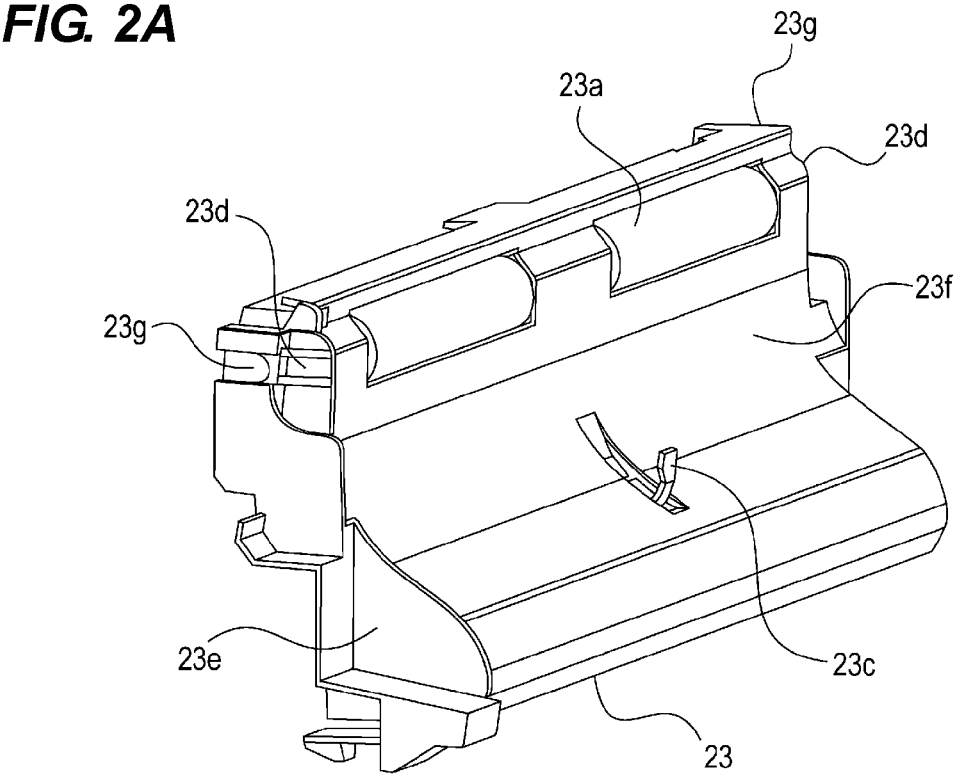
FIGS. 2A and 2B are perspective views illustrating a registration unit of the first embodiment.
Figure 2B:
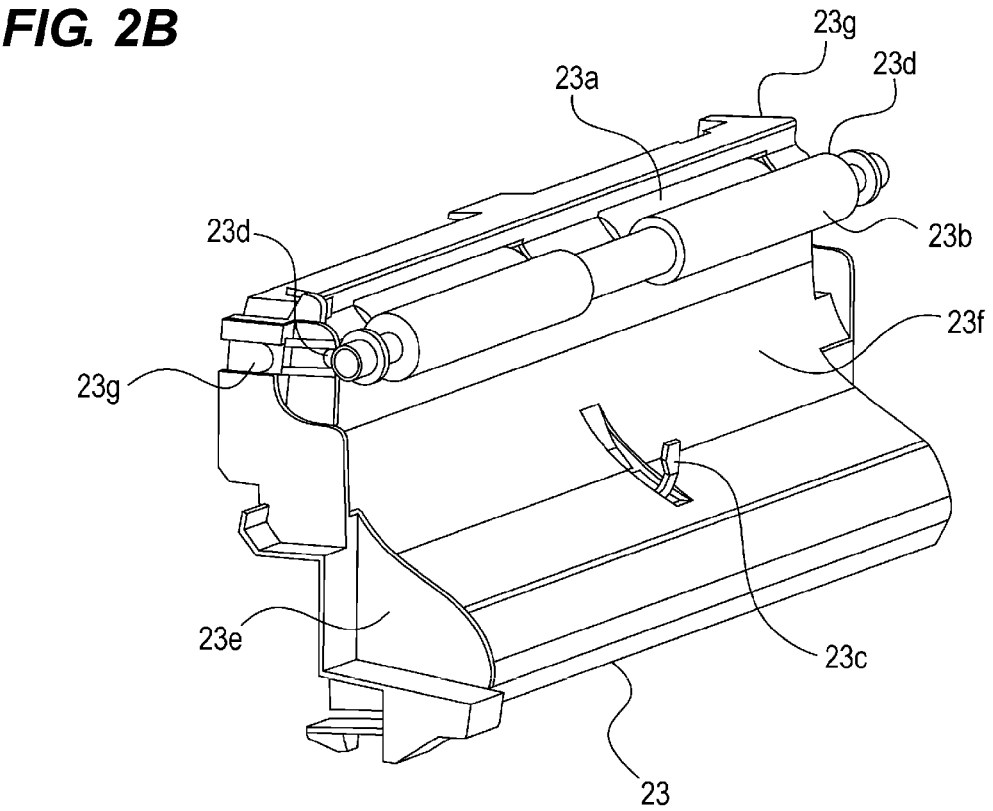

FIGS. 2A and 2B are explanatory diagrams illustrating a configuration of the registration unit of the embodiment. FIG. 2A is a perspective view of the registration unit in a state where the registration outer-roller is removed, and FIG. 2B is a perspective view of the registration unit in a state where the registration outer-roller is added.

The registration unit 23 includes the registration inner-roller 23a as a first roller, the registration outer-roller 23b as a second roller, a recording material detecting sensor unit 23c, and a registration guide 23e.

The recording material detecting sensor unit 23c is a detection unit used for the matching with a conveying timing of the recording material P, and is disposed on the upstream side of a registration nip portion which is configured by the registration inner-roller 23a and the registration outer-roller 23b in a conveyance direction of the recording material. A swing flag of the recording material detecting sensor unit 23c protrudes into a conveyance path 23f of the recording material formed by the registration guide 23e. When the swing flag of the recording material detecting sensor unit 23c is swung by the recording material P guided by the registration guide 23e, a photo-interrupter (not illustrated) of the recording material detecting sensor unit 23c is shielded from light. Therefore, the recording material detecting sensor unit 23c reads a timing when the recording material P is conveyed.

The registration guide 23e serving as a guide member forms the conveyance path 23f of the recording material P and guides the conveyed recording material. The registration guide 23e supports the registration inner-roller 23a, and includes positioning portions 23g with respect to an apparatus body 1 of the image forming apparatus on both sides in a width direction perpendicular to the conveyance direction of the recording material.

The registration outer-roller 23b which is disposed to face the registration inner-roller 23a to form the registration nip portion is positioned in registration outer-roller positioning portions 23d disposed on the both side in the width direction of the registration guide 23e in order to enhance alignment accuracy. The registration outer-roller 23b is provided in an opening/closing door 92 (see FIG. 1) which is provided to be freely opened with respect to the apparatus body 1 of the image forming apparatus. Therefore, when the opening/closing door 92 (see FIG. 1) is opened to easily remove the recording material P in a case where the recording material P is jammed in the conveyance path 23f, the registration outer-roller 23b moves in an opening direction together with the opening/closing door 92 not to be left in the apparatus body 1 of the image forming apparatus but to be separated from the facing registration inner-roller 23a.

(Configuration of Transfer Unit)

Next, the peripheral configuration of the transfer unit 60 will be described using FIGS. 3 to 5.

Figure 3:
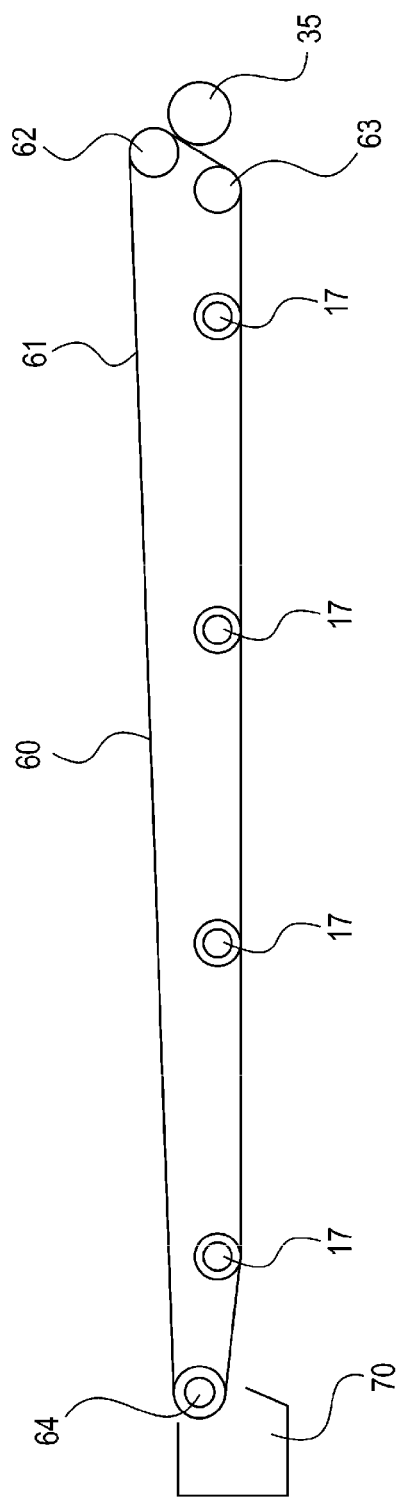
FIG. 3 is an explanatory diagram illustrating a transfer unit of the first embodiment.
Figure 4:
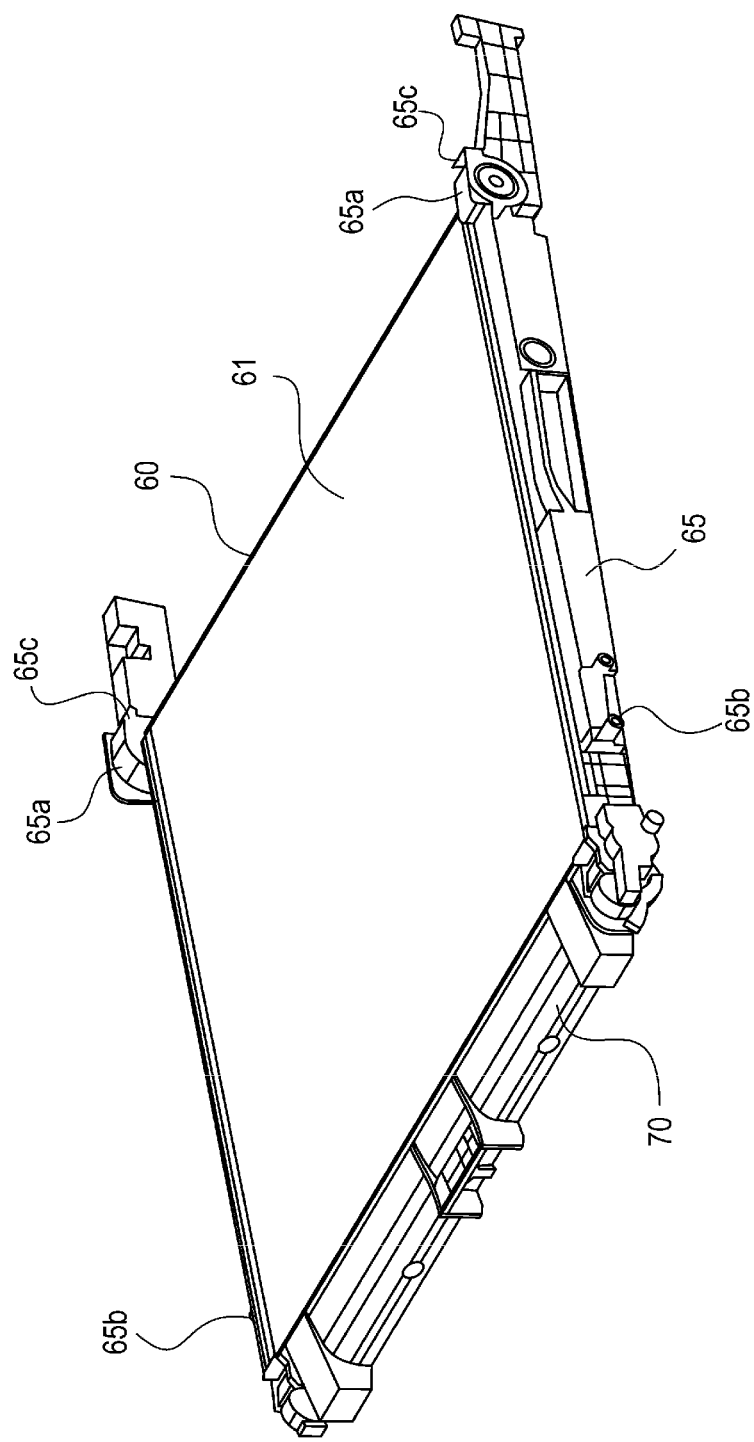
FIG. 4 is an explanatory diagram illustrating the transfer unit of the first embodiment.
Figure 5:
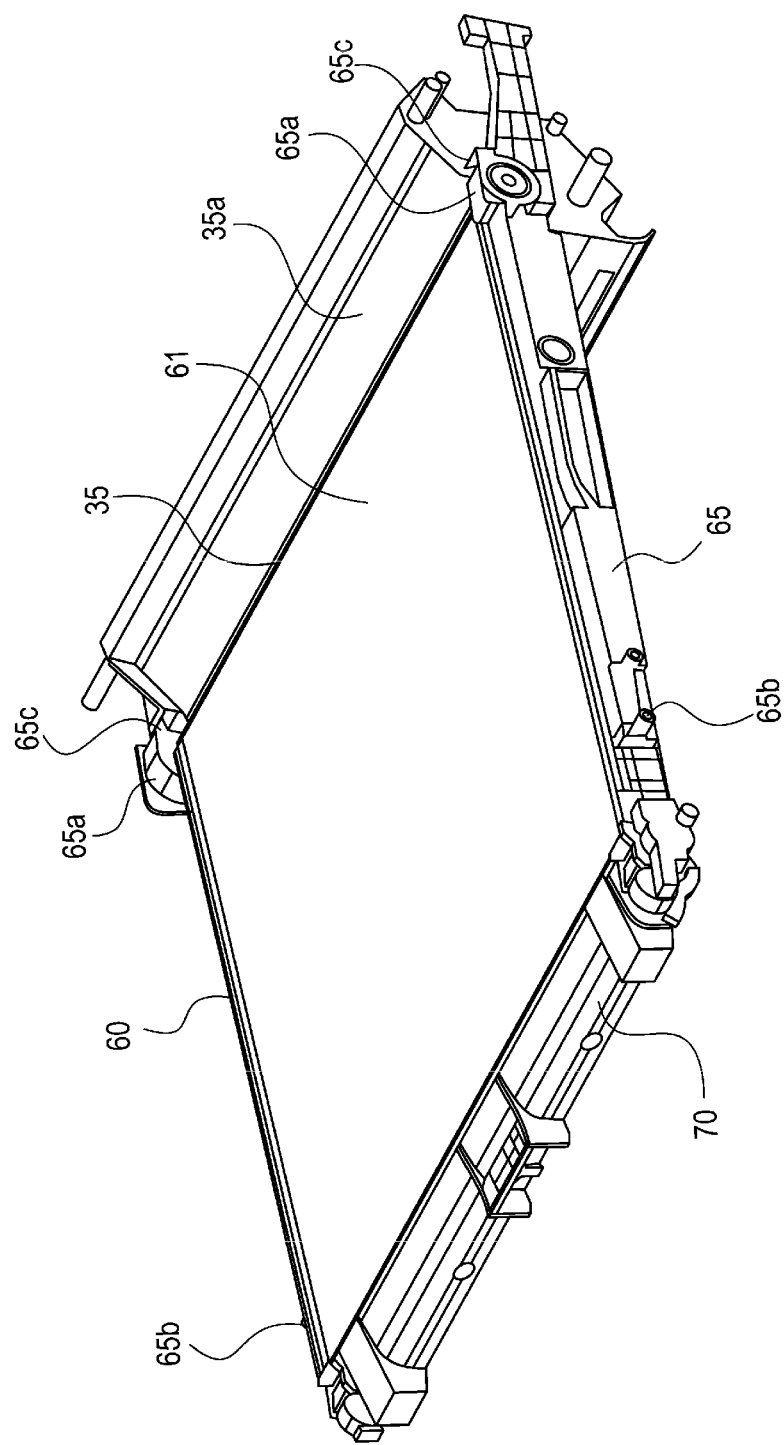
FIG. 5 is an explanatory diagram illustrating the transfer unit of the first embodiment.

FIG. 3 is a cross-sectional view of the surrounding of the transfer unit, FIG. 4 is a perspective view of the transfer unit in a state where the secondary transfer outer-roller is removed, and FIG. 5 is a perspective view of the transfer unit in a state where the secondary transfer outer-roller is added.

The transfer unit 60 includes an intermediate transfer belt 61, a driving roller 62, a tension roller 64, a driven roller 63, a primary transfer roller 17, a transfer frame 65, a tension roller bearing 66, a tension spring 67, a cleaning unit 70, and a secondary transfer outer-roller 35.

As illustrated in FIG. 3, the intermediate transfer belt 61 serving as an image bearing member is an endless belt, and is made of a polyether ether ketone (PEEK) resin in consideration of flexural fatigue resistance. The intermediate transfer belt 61 is suspended among the driving roller 62, the driven roller 63, and the tension roller 64 serving as a suspension member, and rotatably driven by the driving roller 62.

The driving roller 62, the driven roller 63, and the tension roller 64 each are rotatably supported by the transfer frame 65 through bearings.

The primary transfer roller 17 is a primary transfer member which is disposed to face the photosensitive drum 11 with the intermediate transfer belt 61 interposed therebetween and transfers the toner image on the photosensitive drum 11 onto the intermediate transfer belt 61. The primary transfer roller 17 is configured such that the surface of a shaft made of metal (for example, stainless steel) having a diameter of 8 mm is covered by a conductive elastomer, and applies an even high voltage to the intermediate transfer belt 61 by the conductive elastomer. As the elastomer, ethylene-propylene copolymer rubber (EPDM), urethane foam, or the like can be used.

The cleaning unit 70 slidably rubs the intermediate transfer belt 61 with a cleaning blade 77 (see FIG. 1) to remove the transfer toner left on the intermediate transfer belt 61 passed through the secondary transfer portion.

As illustrated in FIG. 4, the transfer frame 65 includes positioning portions 65a and 65b with respect to the apparatus body 1 of the image forming apparatus on both sides in the width direction perpendicular to a rotating direction of the intermediate transfer belt 61.

As illustrated in FIG. 3, a nip portion is formed between the secondary transfer outer-roller 35 serving as a transfer member forms the nip portion and the intermediate transfer belt 61 serving as the image bearing member. As illustrated in FIG. 5, the secondary transfer outer-roller 35 is positioned in a transfer outer-frame positioning portion 65c of the transfer frame 65 through a transfer outer-frame 35a toward the transfer frame 65 in order to enhance the alignment accuracy. The secondary transfer outer-roller 35 is provided in the opening/closing door 92 (see FIG. 1) which is provided to be freely opened with respect to the apparatus body 1 of the image forming apparatus. Therefore, when the opening/closing door 92 (see FIG. 1) is opened to easily remove the recording material P in a case where the recording material P is jammed, the secondary transfer outer-roller 35 moves in an opening direction together with the opening/closing door 92 not to be left in the apparatus body 1 of the image forming apparatus but to be separated from the facing intermediate transfer belt 61.

(Configuration of Detection Unit)

Next, the peripheral configuration of the detection unit 110 will be described using FIGS. 6 and 7.

Figure 6:
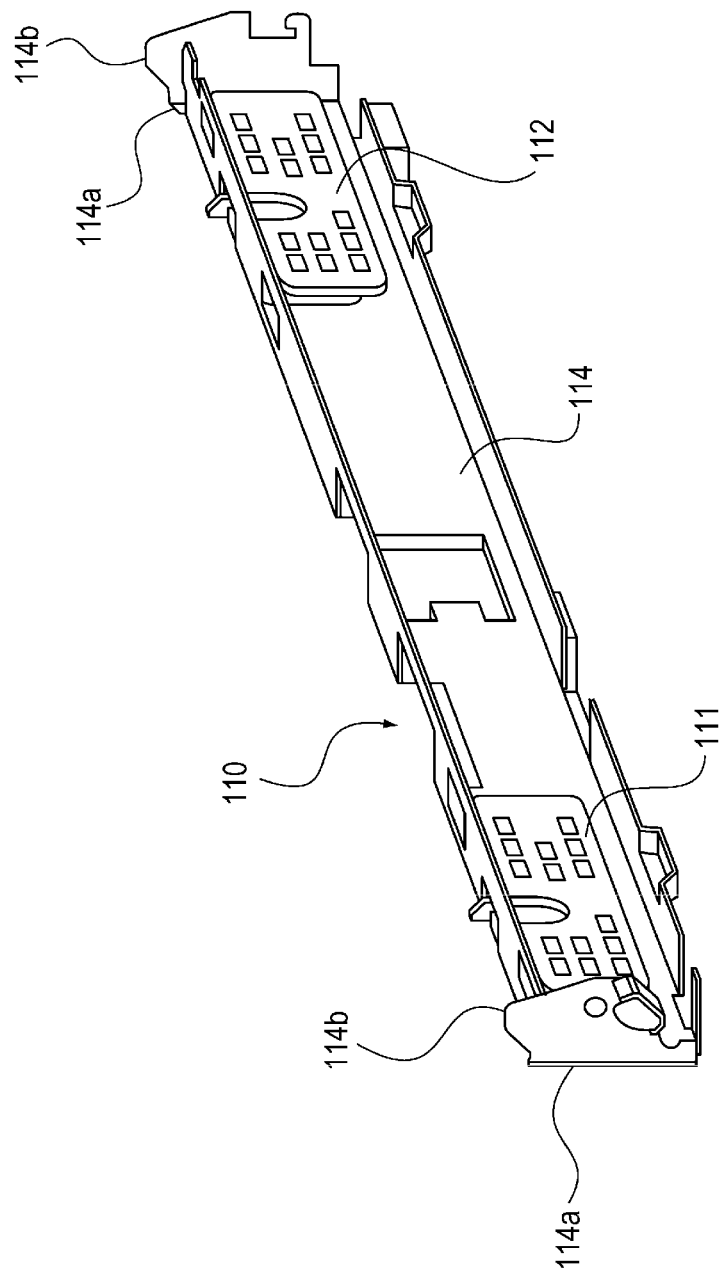
FIG. 6 is an explanatory diagram illustrating a detection unit of the first embodiment.
Figure 7:
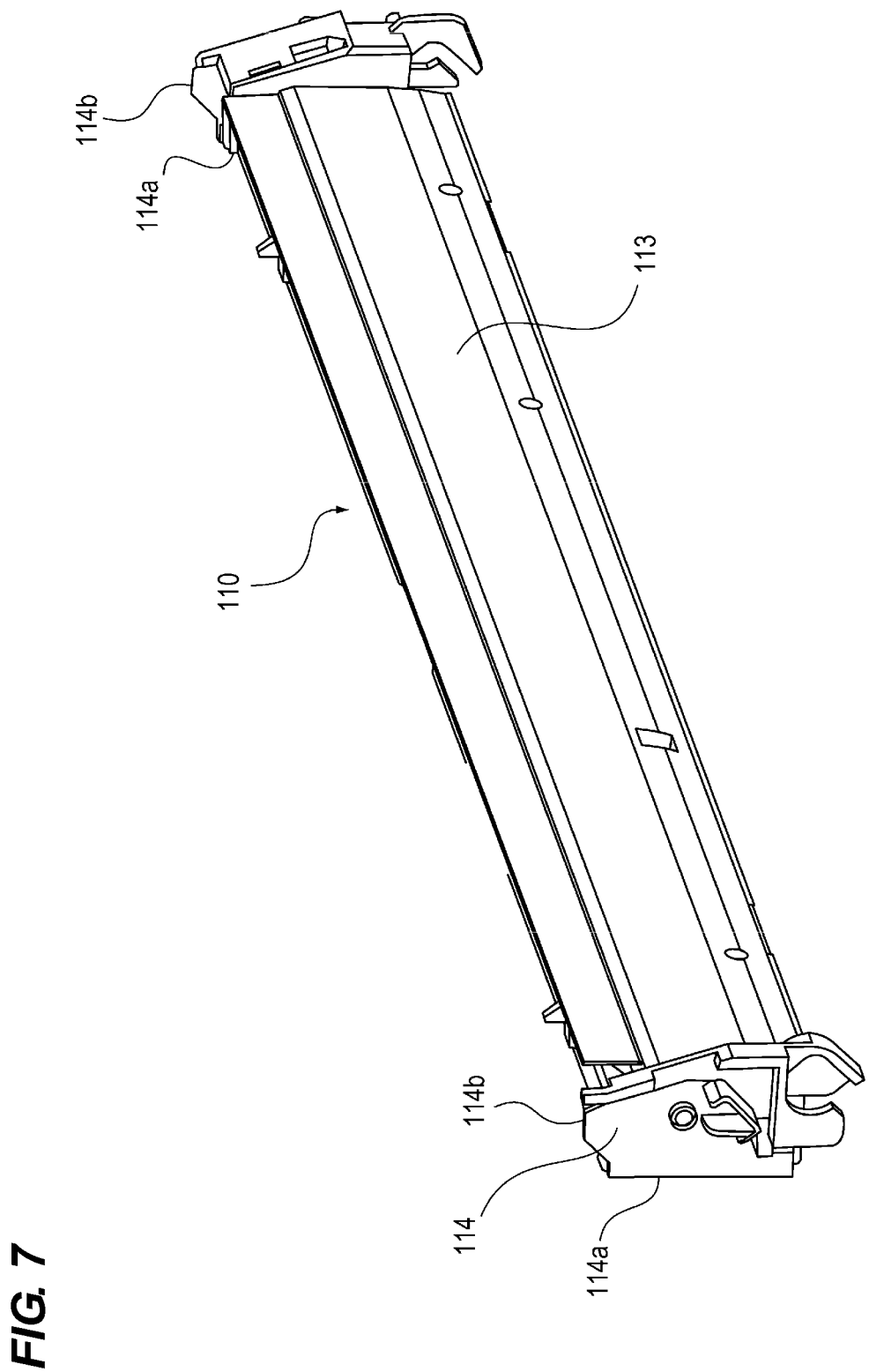
FIG. 7 is an explanatory diagram illustrating the detection unit of the first embodiment.

FIG. 6 is a perspective view of the detection unit 110 in a state where a post-registration guide 113 is removed, and FIG. 7 is a perspective view of the detection unit 110 in a state where the post-registration guide 113 is added.

The detection unit 110 includes a first detecting sensor 111, a second detecting sensor 112, a post-registration guide 113, and a holder 114.

As illustrated in FIG. 6, the first detecting sensor 111 and the second detecting sensor 112 are disposed in parallel in a direction perpendicular to the conveyance direction of the recording material. The first detecting sensor 111 and the second detecting sensor 112 each read the image pattern on the intermediate transfer belt, and detect an inclined amount of the image in the width direction perpendicular to the conveyance direction of the recording material according to a difference between detection timings. Then, the controller of the image forming apparatus makes control such that the image is correctly formed through the writing correction of the laser scanner 13 in proportion to the inclined amount of the image.

As illustrated in FIG. 7, the post-registration guide 113 is a conveyance guide which is disposed on a side facing the image to guide the recording material P conveyed from the registration unit 23 toward the transfer unit 60.

The holder 114 supports the first detecting sensor 111, the second detecting sensor 112, and the post-registration guide 113. In addition, the holder 114 forms a positioning portion 114a (contact surface) with respect to the apparatus body 1 of the image forming apparatus and a positioning portion 114b (contact surface) with respect to the transfer unit 60.

(Configuration of Positioning Member)

Figure 8:
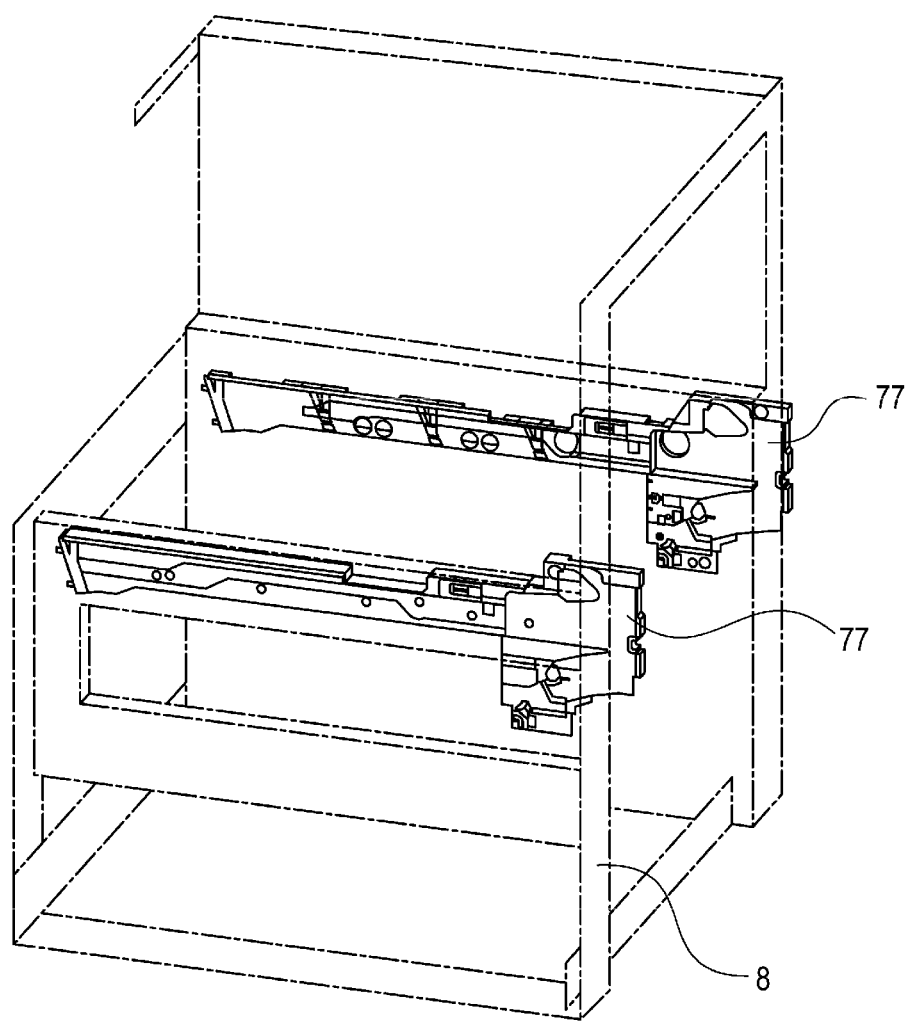
FIG. 8 is an explanatory diagram illustrating a same positioning member of the first embodiment.
Figure 9:
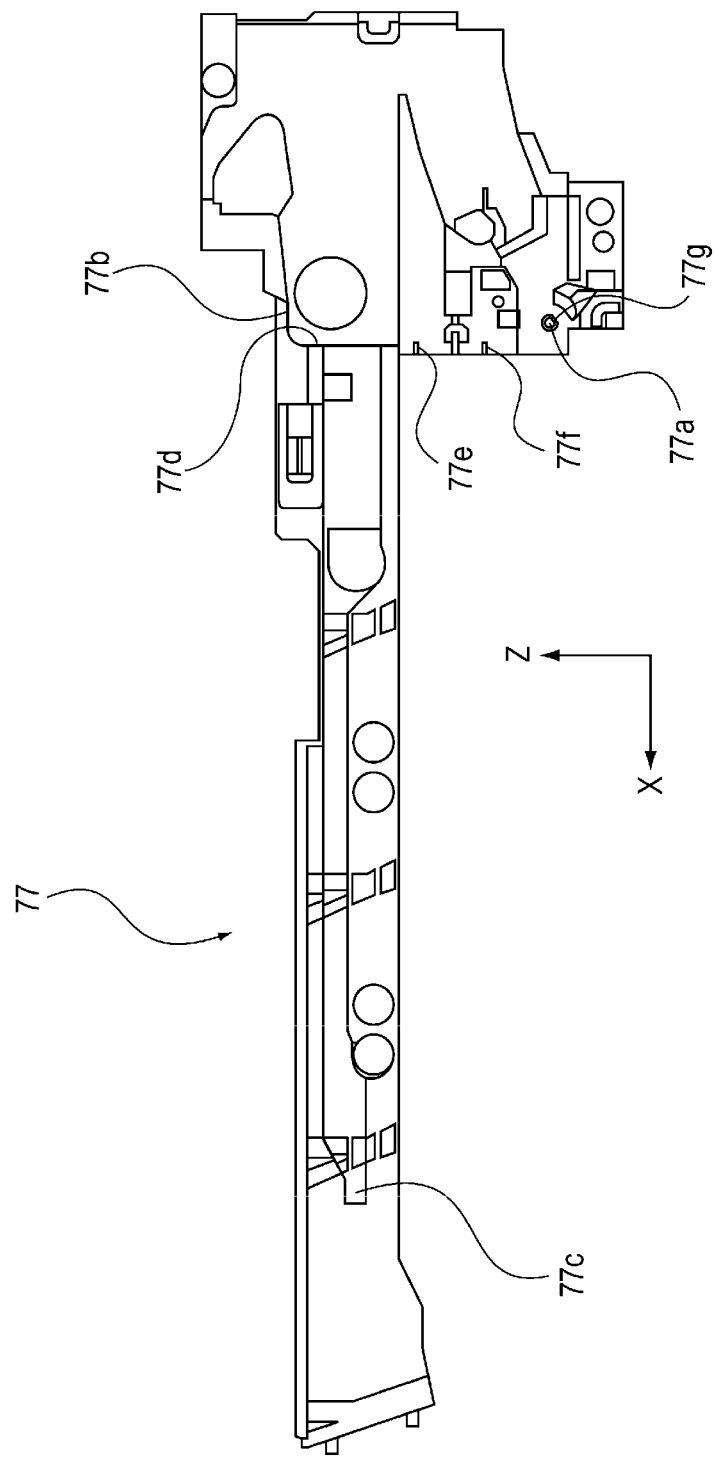
FIG. 9 is an explanatory diagram illustrating the same positioning member of the first embodiment.
Figure 10:
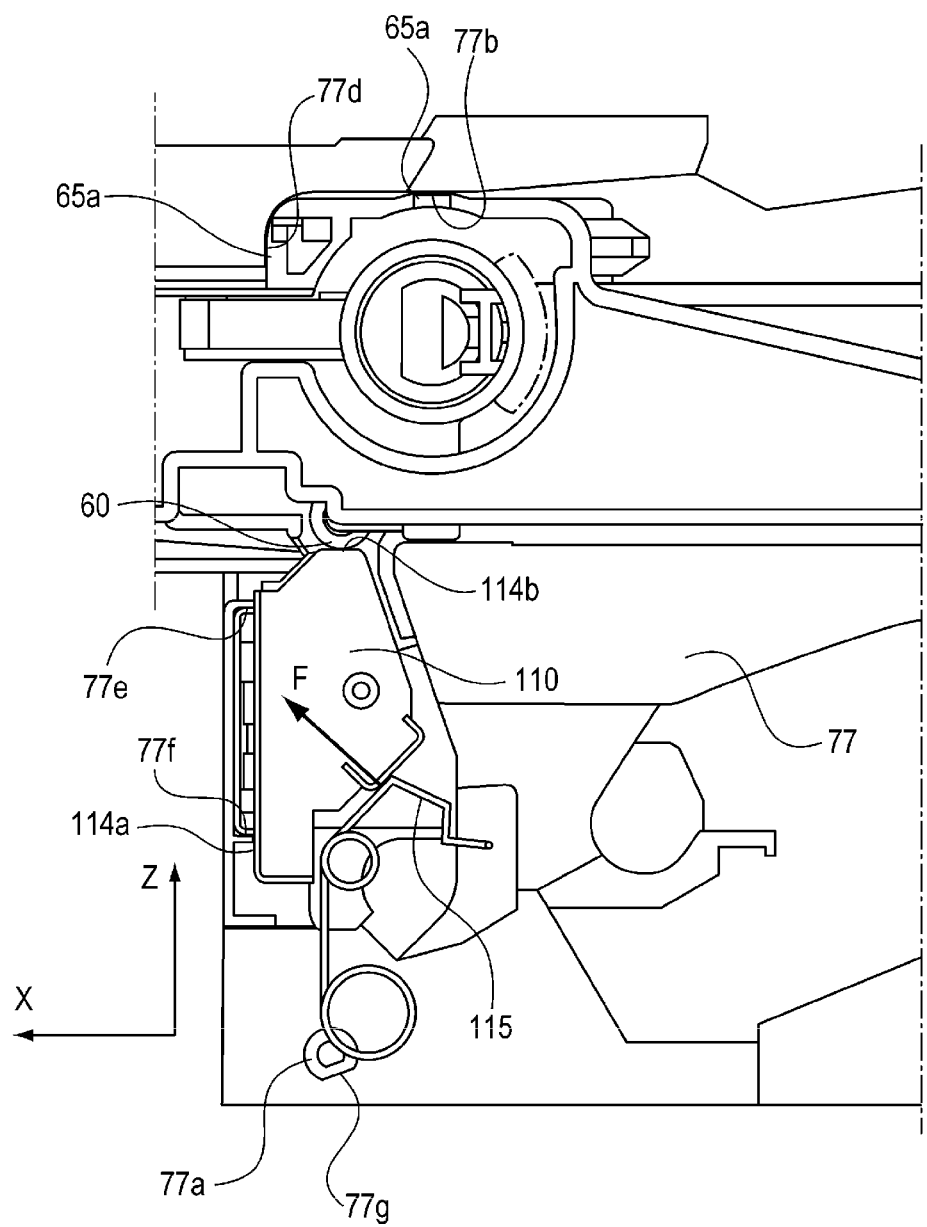
FIG. 10 is an explanatory diagram illustrating the same positioning member of the first embodiment.

FIGS. 8 to 10 are cross-sectional views illustrating the configuration of the positioning member of the embodiment. FIG. 8 is an explanatory diagram illustrating the positioning member (an assembly) which is positioned in a main frame, FIG. 9 is a cross-sectional view illustrating the positioning member (an assembly), and FIG. 10 is a detailed explanatory diagram illustrating the positioning of the detection unit.

The positioning member 77 is an assembly, and is positioned in a main frame 8 serving as a support case of the image forming apparatus as illustrated in FIG. 8. The positioning member 77 is an integrally-molded component made of a resin such as ABS or PC+ABS.

As illustrated in FIG. 9, the positioning member 77 is integrally provided with a first positioning portion 77a to position the registration unit 23. As illustrated in FIG. 10, the first positioning portion 77a is formed in a projection cut in a D shape, and fitted to the groove-shaped positioning portion 23g of the registration unit 23 illustrated in FIG. 2.

Furthermore, as illustrated in FIG. 9, the positioning member 77 is integrally provided with second positioning portions 77b and 77c to be positioned in a direction of arrow Z of the transfer unit 60 and a second positioning portion 77d to be positioned in a direction of arrow X. The second positioning portions 77b and 77c is fitted to the positioning portions 65a and 65b of the transfer unit 60 illustrated in FIG. 3 in the direction of arrow Z. In addition, the second positioning portion 77d abuts on the positioning portion 65a of the transfer unit 60 as illustrated in FIG. 10 by the pressure from the secondary transfer outer-roller 35.

Furthermore, as illustrated in FIG. 9, the positioning member 77 is integrally provided with third positioning portions 77e and 77f to be positioned in a direction of arrow X of the detection unit 110. As illustrated in FIG. 10, the third positioning portions 77e and 77f abut on the positioning portion (a first abutting portion) 114a of the detection unit 110 illustrated in FIG. 7 to press the detection unit 110 in a direction of arrow F by a bias spring 115. In addition, the positioning portion (a second abutting portion) 114b in the direction of arrow of Z perpendicular to the direction of arrow X of the detection unit 110 abuts on the transfer unit 60 by the bias spring 115.

Figure 11A:
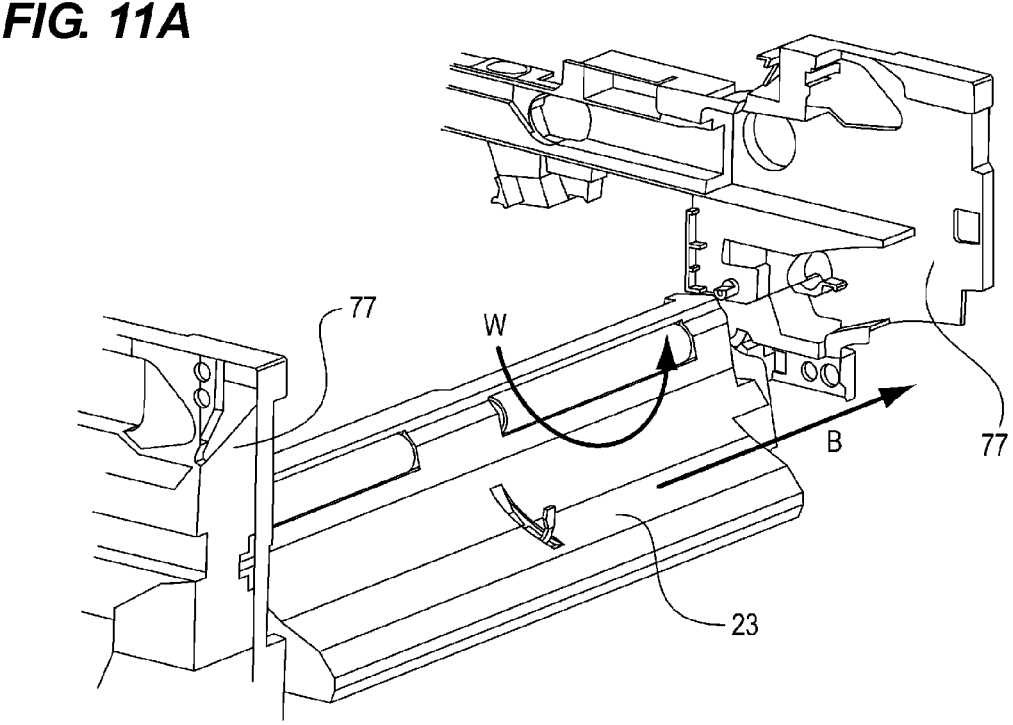
FIGS. 11A and 11B are explanatory diagrams of an insertion/removal configuration of the registration unit of the first embodiment.
Figure 11B:
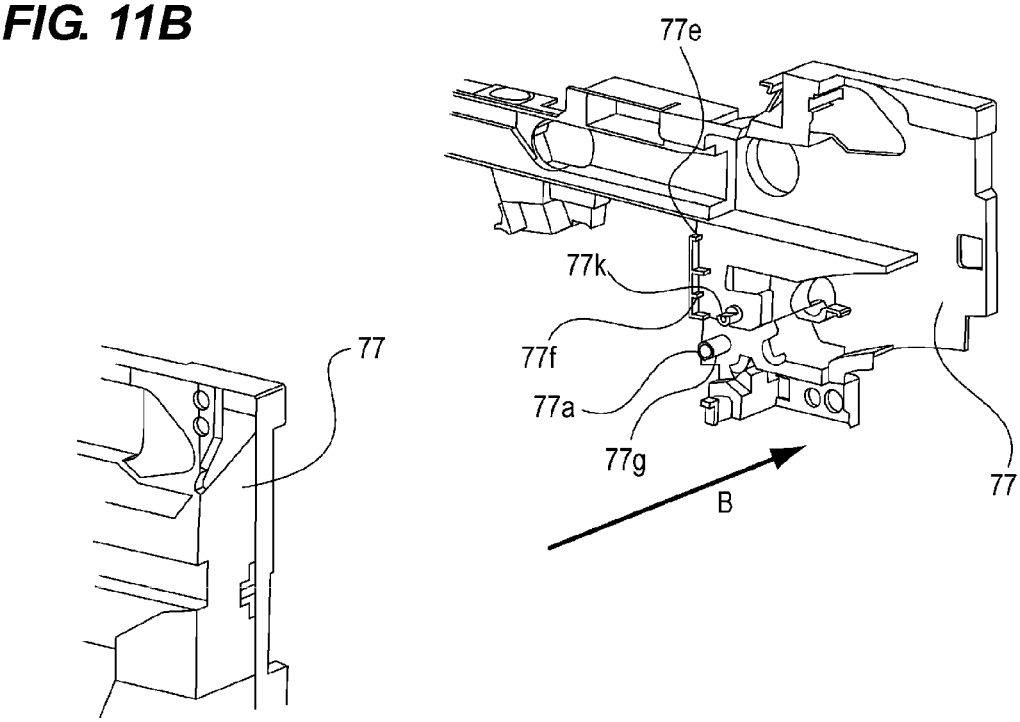
Figure 12:
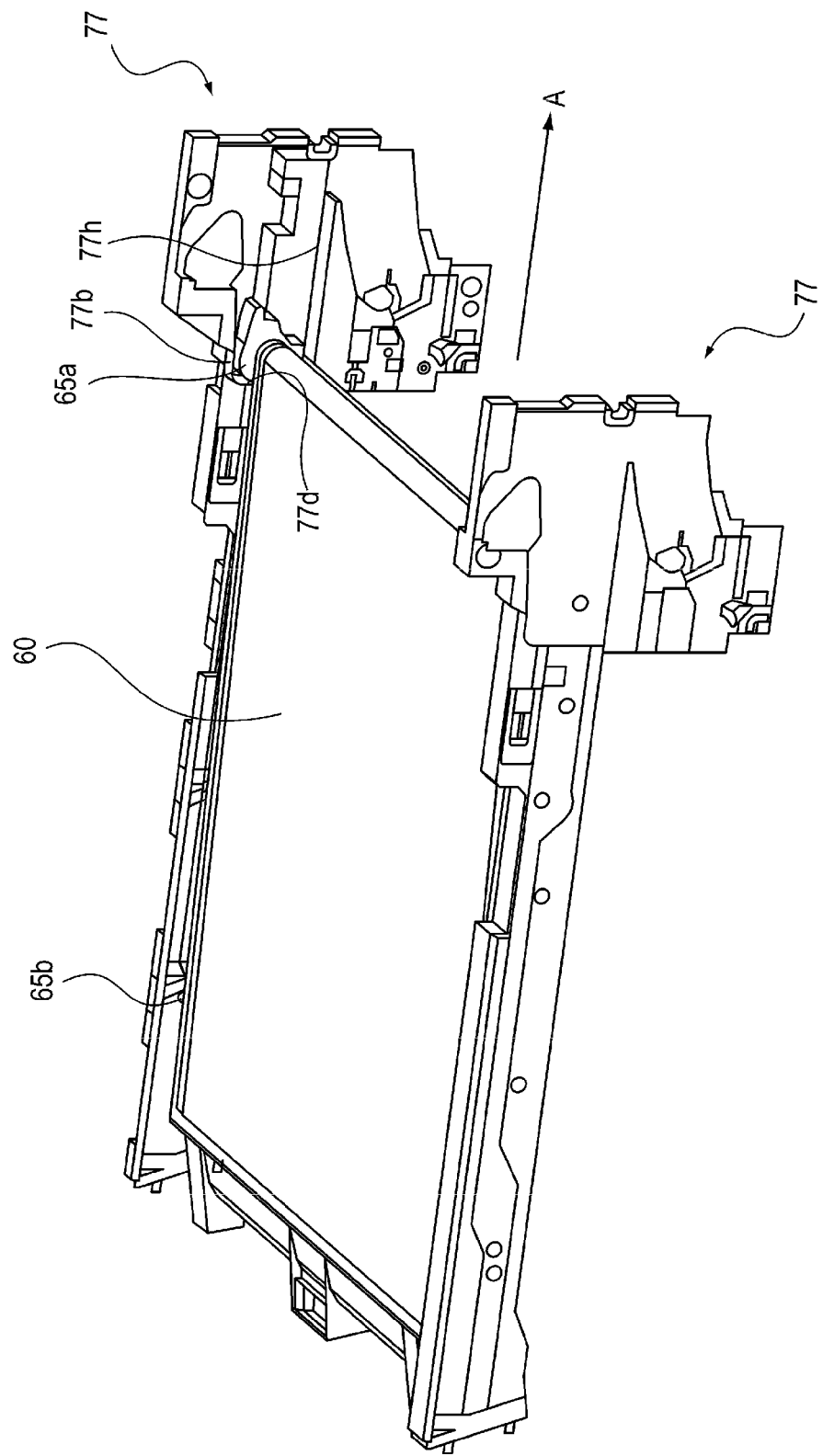
FIG. 12 is an explanatory diagram of the insertion/removal configuration of the transfer unit of the first embodiment.
Figure 13:
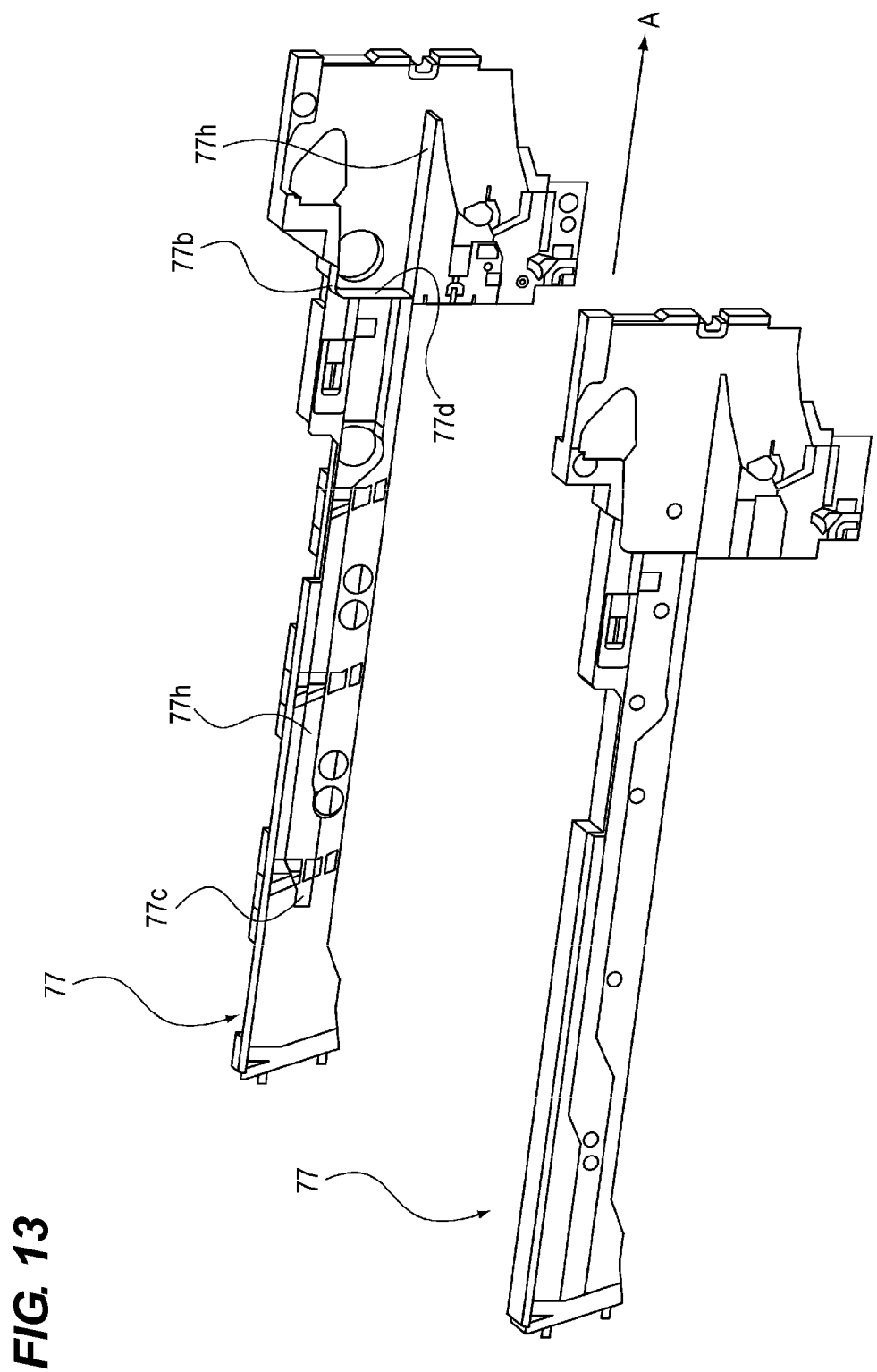
FIG. 13 is an explanatory diagram of the insertion/removal configuration of the transfer unit of the first embodiment.
Figure 14:
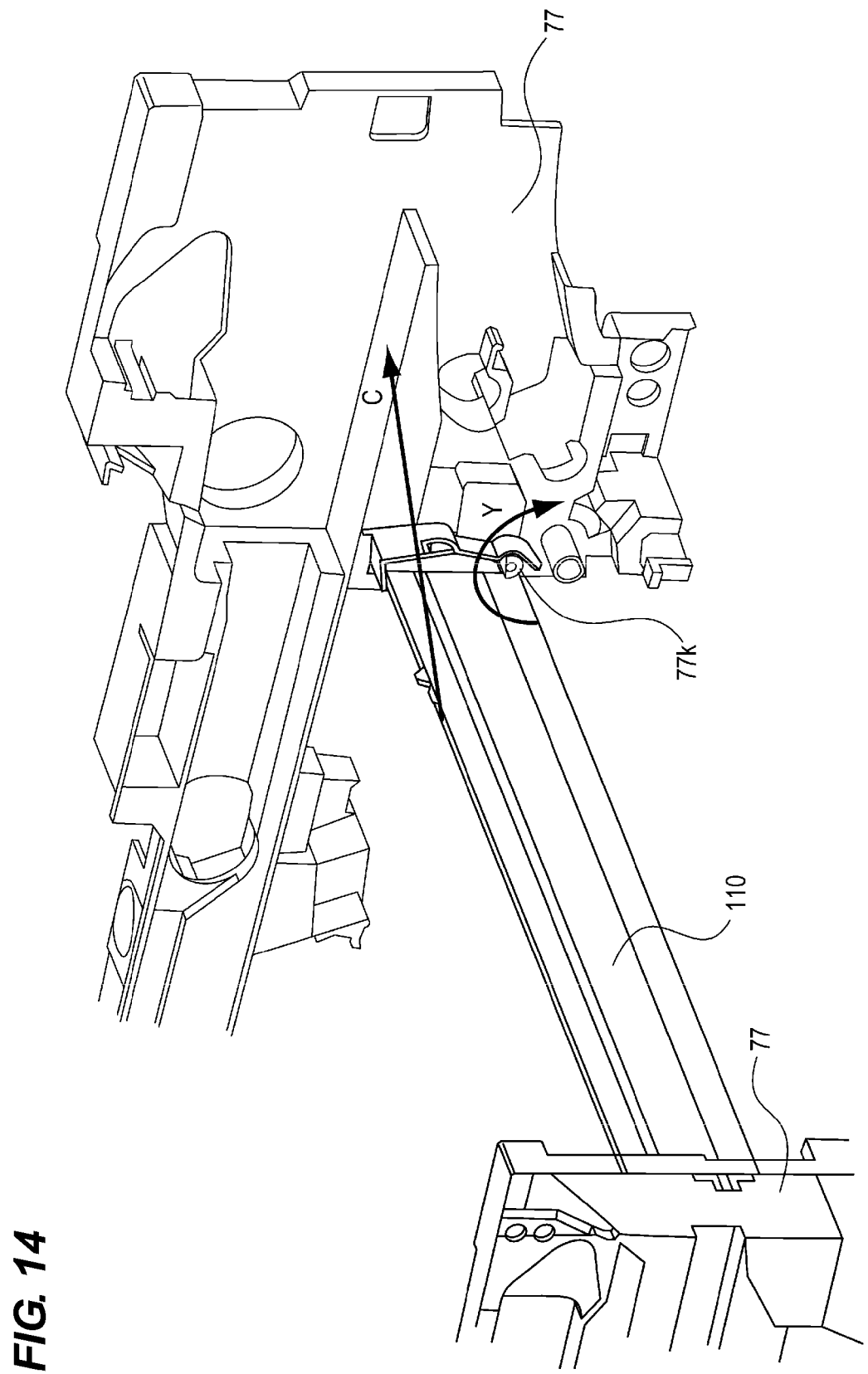
FIG. 14 is an explanatory diagram of the insertion/removal configuration of the detection unit of the first embodiment.

Next, insertion/removal configurations of the registration unit, the transfer unit, and the detection unit will be described using FIGS. 11 to 14. FIGS. 11 to 14 are explanatory diagrams of the insertion/removal configurations of the registration unit, the transfer unit, and the detection unit. FIGS. 11A and 11B are explanatory diagrams of the insertion/removal configuration of the registration unit. FIGS. 12 and 13 are explanatory diagrams of the insertion/removal configuration of the transfer unit. FIGS. 14 and 11B are explanatory diagrams of the insertion/removal configuration of the detection unit.

As illustrated in FIG. 11B, the positioning member 77 is integrally provided with a guide portion 77g to insert or remove the registration unit 23. As illustrated in FIG. 11B, the guide portion 77g is cut in a D shape to guide the positioning portion 23g of the groove-shaped registration unit 23. As illustrated in FIG. 11A, the positioning portion 23g of the groove-shaped registration unit 23 is rotated about the shaft of the positioning portion 77a by a predetermined angle (herein, 10°) in a direction of arrow W so as to be fitted to the phase of the D shape of the positioning portion 77a. Then, as illustrated in FIG. 11B, the D-shaped slope becomes the guide portion 77g, and the registration unit 23 can be inserted or removed in a direction of arrow B from the opening/closing door 92 (that is, a direction of the same phase as the D-shaped groove).

Furthermore, as illustrated in FIG. 13, the positioning member 77 is integrally provided with a guide portion 77h to insert or remove the transfer unit 60. As illustrated in FIG. 12, by pulling the transfer unit 60 out in a direction of arrow A on a side near the opening/closing door 92, the transfer unit 60 is extracted from the positioning portions 77b, 77c, and 77d as illustrated in FIG. 13. In this way, the guide portion 77h guides the positioning portions 65a and 65b of the transfer unit 60, and the transfer unit 60 can be inserted or removed from the opening/closing door.

Furthermore, as illustrated in FIG. 11B, the positioning member 77 is integrally provided with a guide portion 77k to insert or remove the detection unit 110. As illustrated in FIG. 14, the detection unit 110 is rotated about the shaft of the guide portion 77k in a direction of arrow Y by a predetermined angle (herein, 60°) so as to be fitted to the D shape of the guide portion 77k. Then, the D-shaped slope of the guide portion 77k becomes the guide portion, and the detection unit 110 can be inserted or removed in a direction of arrow C of FIG. 14 from the opening/closing door (that is, a direction of the same phase as the D-shaped groove).

According to the embodiment, when each of units is inserted or removed at the time of maintenance, the guide portions for exchanging the registration unit 23, the transfer unit 60, and the detection unit 110 from the opening/closing door 92 are configured to be provided in the same positioning member. Therefore, since the positioning portions of the respective units are provided at a place where the guide portions pass through, the positioning portions can be configured by the same member.

Therefore, since the registration unit 23, the transfer unit 60, and the detection unit 110 are all positioned at the same positioning member 77, the following effects can be obtained.

By improving the alignment of the registration unit 23 and the transfer unit 60, the recording material P can be correctly sent, and the recording material P can be prevented from meandering.

In addition, by improving the alignment of the transfer unit 60 and the detection unit 110, it is possible to correctly send the image formed on the intermediate transfer belt 61.

Furthermore, by improving the alignment of the registration unit 23 and the detection unit 110, it is possible to reduce a relative inclination of the image with respect to the recording material P. Therefore, it is possible to stabilize a geometric characteristic between the recording material P and the image.

In addition, the respective guide portions are integrally provided in the same positioning member 77. Therefore, it is possible to make a configuration without a stepped joint portion which may be generated in a case where a connected portion between the guide portion and the positioning portion is composed of separated components, and the maintenance performance is improved.

Furthermore, since the number of components of the apparatus is also reduced, it comes less need to secure a space such as a component mounting portion, so that it is possible to save space for the image forming apparatus.

Further, in the embodiment, the description has been described about the registration outer-roller 23b which is configured to be positioned in the registration guide 23e, but the invention is not limited thereto, and the positioning may be made to the same positioning member 77.

Similarly, the description also has been described about the secondary transfer outer-roller 35 which is configured to be positioned to the transfer frame 65 through the transfer outer-frame 35a, but the invention is not limited thereto, and the positioning may be made to the same positioning member 77.

Second Embodiment

An image processing apparatus according to a second embodiment of the invention will be described. Since the configuration of the same positioning member is equal to that of the above-mentioned first embodiment, the description thereof will not be repeated herein.
(Configuration of Positioning Registration Outer-Roller)

Figure 15A:
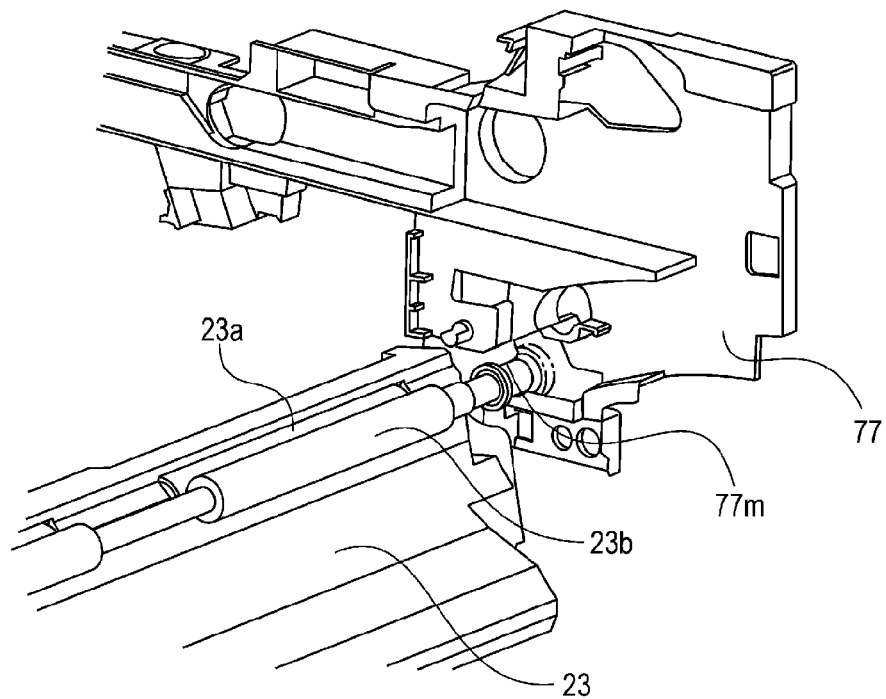
FIGS. 15A and 15B are explanatory diagrams illustrating a registration unit of a second embodiment.
Figure 15B:
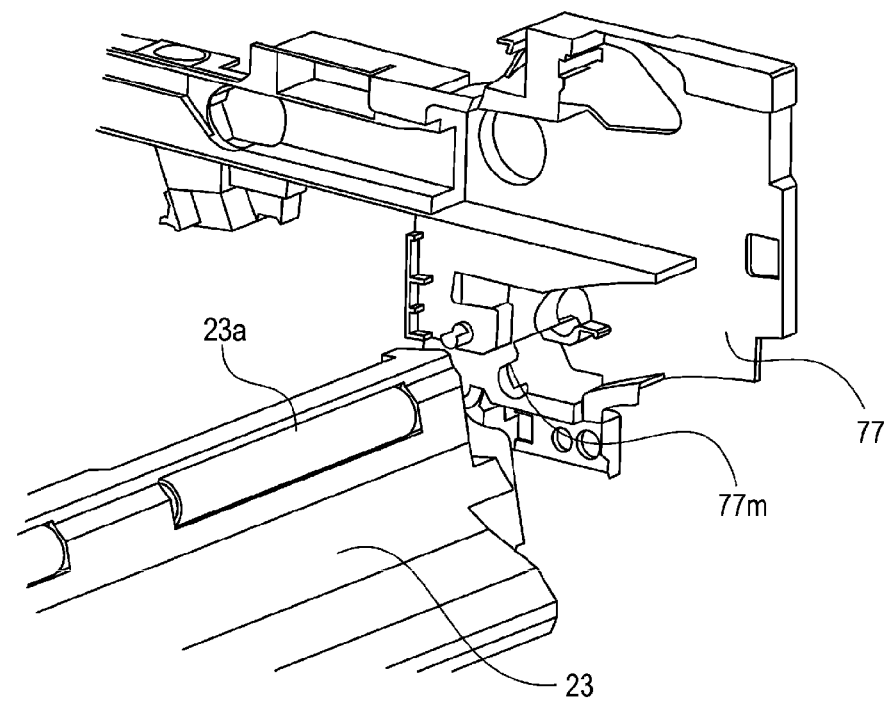

FIGS. 15A and 15B are perspective views illustrating a configuration of positioning the registration outer-roller of the embodiment. FIG. 15A is a perspective view in which the registration outer-roller is illustrated, and FIG. 15B is a perspective view in which the registration outer-roller is not illustrated.

In the image forming apparatus, the registration outer-roller 23b may be formed by a rubber roller which rotatably drives, and the registration inner-roller 23a may be formed by a resin roller.

In this case, compared to the registration inner-roller 23a, after the recording material P is correctly conveyed, there is a need to increase the alignment accuracy on a side near the registration outer-roller 23b having a high friction coefficient against the recording material P.

In the embodiment, a positioning portion 77m of the registration outer-roller 23b is provided in the same positioning member 77 in order to secure the alignment of the transfer unit 60 and the detection unit 110.

Therefore, even when the registration outer-roller 23b is the rubber roller of the driving side, it is possible to stabilize the geometric characteristic between the recording material P and the image similarly to the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077455, filed Apr. 4, 2014, which is hereby incorporated by reference herein in its entirety.

What is claimed is:

1. An image forming apparatus comprising:
   an image bearer configured to include an image bearing member which bears a toner image to be transferred onto a recording material conveyed;
   a conveyer configured to convey the recording material to the image bearer in a status that skew of the recording material is corrected;
   a door for opening and closing an opening through which the image bearer is inserted or removed;
   a frame:
   a first positioning member disposed at a first side of the frame and configured to position the conveyer and to position the image bearer; and
   a second positioning member disposed at a second side of the frame, opposite to the first side and configured to position the conveyer and to position the image bearer,
   wherein each of the first positioning member and the second positioning member includes a guide portion which guides the conveyer and the image bearer which is inserted or removed through the opening in a state that the door is opened.

2. The image forming apparatus according to claim 1, further comprising:
   a detector configured to read an image formed in the image bearing member to correct the image formed in the image bearing member,
   wherein each of the first positioning member and the second positioning member positions the detector and guides the detector which is inserted or removed through the opening in the state that the door is opened.

3. The image forming apparatus according to claim 2, wherein the detector includes a first sensor and a second sensor which are provided in parallel in a width direction perpendicular to a conveyance direction of the recording material, and wherein an inclination of the image formed in the image bearing member is corrected based on signals from the first sensor and the second sensor.

4. The image forming apparatus according to claim 2, wherein the detector includes a first abutting portion which is provided between the conveyer and the image bearer and abuts on the first positioning portion and the second positioning portion and a second abutting portion which abuts on the image bearer in a direction perpendicular to the first abutting portion.

5. An image forming apparatus comprising:
an image bearer configured to include an image bearing member which bears a toner image to be transferred onto a recording material conveyed;
a conveyer configured to convey the recording material to the image bearer in a status that skew of the recording material is corrected;
a frame of the image forming apparatus;
a first positioning member which is provided at a first side of the frame and positions one side of the conveyer in a width direction of the recording material perpendicular to a conveying direction of the recording material and positions the one side of the image bearer in the width direction of the recording material; and
a second positioning member which is provided at a second side of the frame, opposite to the first side and positions the other side of the conveyer in the width direction of the recording material and positions the other side of the image bearer in the width direction of the recording material
wherein each of the first positioning member and the second positioning member includes a guide portion which guides the conveyer and the image bearer which is inserted or removed through the opening in a state that the door is opened.

6. The image forming apparatus according to claim 5, wherein each of the first positioning member and the second position member guides the conveyer which is inserted and removed with respect to an apparatus body; and
each of the first positioning member and the second positioning member guides the image bearer which is inserted and removed with respect to the apparatus body.

7. The image forming apparatus according to claim 5, further comprising:
a detector configured to read an image formed in the image bearing member to correct the image formed in the image bearing member,
wherein each of the first positioning member and the second positioning member is configured to be provided in the positioning member and to position the detector.

8. The image forming apparatus according to claim 7, wherein each of the first positioning member and the second positioning member guides the detector which is inserted or removed with respect to the apparatus body.

9. The image forming apparatus according to claim 5, wherein each of the first positioning member and the second positioning member is an integrally-molded component.

10. The image forming apparatus according to claim 9, wherein the first positioning member and the second positioning member are disposed so as that the first positioning member is provided on a first side of the frame and the second positioning member is provided on a second side of the frame.

11. The image forming apparatus according to claim 5, wherein the conveyer further comprises:
a guide member configured to guide the conveyed recording material by abutting with the first positioning member and the second positioning member, and
a first roller provided in the guide member and configured to nip a recording material with a second roller to convey the recording material.

12. The image forming apparatus according to claim 5, further comprising a door, wherein
the image bearer further comprises a transfer frame configured to be positioned by abutting to the first positioning member and the second positioning member, and
a suspension member configured to suspend the image bearing member, and
the image forming apparatus further comprises a transfer member configured to be provided in the door and to form a nip portion with respect to the image bearing member, wherein the transfer member is positioned in the transfer frame or the first positioning member and the second positioning member in a state that the door is closed, and moves together with the door and is separated from the image bearing member when the door is opened.

13. The image forming apparatus according to claim 5, further comprising a photosensitive drum, wherein the image bearing member is a transfer belt which is transferred the toner image from the photosensitive dram.

14. The image forming apparatus according to claim 5, wherein
the image bearing member is a transfer belt which bears an image on an outer peripheral surface,
the image bearer further comprises a roller to support the transfer belt and a holder to support rotatably the roller, and
the image bearer is positioned by abutting with each of the first positioning member and the second positioning.

15. The image forming apparatus according to claim 5, wherein the conveyer is detachably attached to the image forming apparatus and the image bearer is detachably attached to the image forming apparatus.

16. The image forming apparatus according to claim 5, further comprising a conveying portion which conveys the recording material to the conveyer, wherein the conveyer further comprises a roller with which a leading edge of the recording material contacts for correcting skew of the recording material conveyed by the conveying portion.

17. An image forming apparatus, comprising
an image bearer configured to include an image bearing member which bears a toner image to be transferred onto a recording material conveyed;
a conveyer configured to convey the recording material to the image bearer in a status that skew of the recording material is corrected;
a door for opening and closing an opening through which the image bearer is inserted or removed;
a frame of the image forming apparatus;
a first positioning member which is provided at a first side of the frame and positions the conveyer and the image bearer; and
a second positioning member configured to be provided on a second side of the frame opposite to the first side and positions the conveyer and the image bearer, wherein each of the first positioning member and the second positioning member includes a guide portion which guides the conveyer and the image bearer which is inserted or removed through the opening in a state that the door is opened.

18. The image forming apparatus according to claim 17, wherein the conveyer includes
a guide member configured to guide the conveyed recording material by abutting with the first positioning member and the second positioning member, and
a first roller configured to be provided in the guide member and to nip a recording material with a second roller to convey the recording material.

19. The image forming apparatus according to claim 18, further comprising a door,
wherein the second roller is provided in the door, and
wherein the second roller is positioned in the guide member or the first positioning member and the second positioning member when the door is closed, and moves together with the door and is separated from the first roller when the door is opened.

20. The image forming apparatus according to claim 19, wherein the second roller is a rubber roller which rotatably drives, and the first roller is a resin roller which is rotatably driven along the second roller, and
wherein each of the first positioning member and the second positioning member includes a positioning portion of the second roller.

21. The image forming apparatus according to claim 17, further comprising a door, wherein
the image bearer further comprises
a transfer frame configured to be positioned by abutting to the first positioning member and the second positioning member, and
a suspension member configured to suspend the image bearing member,
the image forming apparatus further comprising a transfer member configured to be provided in the door and to form a nip portion with respect to the image bearing member, and
the transfer member is positioned in the transfer frame or the first positioning member and the second positioning member in a state that the door is closed, and moves together with the door and is separated from the image bearing member when the door is opened.

22. The image forming apparatus according to claim 17, wherein each of the first positioning member and the second positioning member is an integrally-molded component.

23. The image forming apparatus according to claim 17, further comprising:
a detector configured to read an image formed on the image bearing member to correct the image formed on the image bearing member,
wherein each of the first positioning member and the second positioning member positions the detector.

24. The image forming apparatus according to claim 23, wherein each of the first positioning member and the second positioning member guides the detector.

25. The image forming apparatus according to claim 17, further comprising a photosensitive drum, wherein the image bearing member is a transfer belt onto which is transferred the toner image from the photosensitive drum.

26. The image forming apparatus according to claim 17, wherein
the image bearing member is a transfer belt which bears image on outer peripheral surface,
the image bearer further comprises a roller to support the transfer belt and a holder to support rotatably the roller, and
the image bearer is positioned by the holder abutting each of the first positioning member and the second positioning member.

27. The image forming apparatus according to claim 17, wherein the conveyer is detachably attached to the image forming apparatus and the image bearer is detachably attached to the image forming apparatus.

28. The image forming apparatus according to claim 17, further comprising a conveying portion which conveys the recording material to the conveyer, wherein the conveyer further comprises a roller with which a leading edge of the recording material contacts for correcting skew of the recording material conveyed by the conveying portion.

* * * * *